United States Patent [19]

Pauza et al.

[11] 3,910,664

[45] Oct. 7, 1975

[54] MULTI-CONTACT ELECTRICAL CONNECTOR FOR A CERAMIC SUBSTRATE OR THE LIKE

[75] Inventors: William Vito Pauza; Edward Michael Poltonavage, both of Palmyra, Pa.

[73] Assignee: AMP Incorporated, Harrisburg, Pa.

[22] Filed: June 12, 1974

[21] Appl. No.: 478,473

Related U.S. Application Data

[63] Continuation-in-part of Ser. No. 321,106, Jan. 4, 1973, abandoned.

[52] U.S. Cl........... 339/17 CF; 339/75 M; 339/174; 339/176 MP

[51] Int. Cl.²...................... H01R 13/54; H05R 1/18

[58] Field of Search............339/17 CF, 75 M, 174, 339/176 MP

[56] References Cited

UNITED STATES PATENTS

| | | | |
|---|---|---|---|
| 3,573,617 | 4/1971 | Randolph et al. | 339/17 CF X |
| 3,846,737 | 11/1974 | Spaulding | 339/174 |

*Primary Examiner*—Roy Lake

*Assistant Examiner*—E. F. Desmond

*Attorney, Agent, or Firm*—Allan B. Osborne, Esq.

[57] ABSTRACT

A multi-contact electrical connector for electrically interconnecting external electrical circuitry of a circuit board or the like with a row of spaced terminal contact pads disposed on each of two opposing side surfaces of a ceramic substrate or the like comprises a housing and two rows of electrical contacts disposed therein, the housing having a supporting surface for supporting the substrate between the two rows of contacts in a generally parallel relationship to, and spaced from, the board. Two rows of recessed shoulders formed in the supporting surface provide means for retaining resiliently flexible spring portions of the contacts in a partially flexed, preloaded condition prior to the substrate being supported on the supporting surface of the housing. When the substrate is supported on the supporting surface between the spring portions of the two rows of contacts with the contact pads on the side surfaces of the substrate respectively electrically contacting contact surfaces on the contact spring portions, the spring portions are additionally flexed to assume a desired fully loaded condition.

2 Claims, 7 Drawing Figures

FIG. 3

MULTI-CONTACT ELECTRICAL CONNECTOR FOR A CERAMIC SUBSTRATE OR THE LIKE

CROSS REFERENCE TO RELATED APPLICATION

This application is a continuation-in-part application of Ser. No. 321,106, filed Jan. 4, 1973, and now abandoned.

BACKGROUND OF THE INVENTION

The present invention broadly relates to an electrical connector for interconnecting a ceramic substrate or the like with external electrical circuitry and more particularly is concerned with a multi-contact electrical connector for electrically interconnecting external circuitry of a circuit board or the like with a row of spaced terminal contact pads disposed on each of two opposing side surfaces of a ceramic substrate or the like.

Integrated circuit devices are commonly mounted on relatively thin ceramic plates, commonly referred to as substrates, which have conductors thereon extending from the integrated circuit device or "chip" to the marginal portions of one face of the substrate. Enlarged contact areas or contact pads are formed at the ends of the substrate conductors on one of the faces of the substrate for connecting these substrate conductors to external circuitry. The substrate conductors are commonly connected to the external circuitry by multi-contact electrical connectors and a variety of types of connectors have been developed for use with the above-described previously known designs of ceramic substrates. One such connector is illustrated and described in our U.S. patent application, Ser. No. 158,778, filed July 1, 1971, now U.S. Pat. No. 3,754,203, granted Aug. 21, 1973.

Recently, and for reasons dictated by substrate manufacturing considerations and other reasons, substrates have been introduced which have their contact pads located on their side surfaces rather than on one of their opposing faces. Presently known multi-contact connectors, which were designed for substrates of the type having contact pads on one of their faces, cannot be used with these recently developed types of substrates and cannot be adapted for use with substrates having contact pads on their side surfaces.

More recently, a multi-contact electrical connector has been designed for this latest type of substrate having contact pads on its side surfaces. The aforementioned connector is illustrated and described in our U.S. patent application, Ser. No. 186,876, filed Oct. 6, 1971, now U.S. Pat. No. 3,753,211 granted Aug. 14, 1973. The multi-contact electrical connector of the present invention constitutes an improvement upon the connector described in the aforementioned application.

An object of the invention, therefore, is to provide a multi-contact electrical connector for ceramic substrates or the like having contact pads on their side surfaces.

Another object of the invention is to provide a multi-contact electrical connector which will occupy a minimum amount of space in a circuit assembly.

A yet another object of the invention is to provide a multi-contact electrical connector which is simple in construction, which can be inexpensively manufactured and assembled, and which will insure effective electrical contact with each of the contact pads on the side surfaces of a ceramic substrate.

A further object of the invention is to provide a multi-contact electrical connector which can be mounted on a printed circuit board under confined working conditions.

A still further object of the invention is to provide a multi-contact electrical connector which achieves a low contact resistance by having two rows of preloaded contacts therein which impose high normal contact forces upon the contact pads of the substrate even though only a relatively slight deflecting of the contacts by the substrate occurs when the substrate is positioned in the connector between the two rows of contacts.

A yet another object of the invention is to provide a multi-contact electrical connector having a housing construction which, during the electrical termination of the connector to external circuitry by a soldering operation, prevents the flowing of solder into the connector which would, if not prevented, interfere with the desired pluggability of the substrate into the connector and shorten the useful life of the connector.

These and other objects of the invention are achieved in a preferred embodiment thereof wherein a multi-contact electrical connector is provided for supporting a ceramic substrate or the like on a circuit board or the like and for electrically interconnecting external electrical circuitry of the board with a row of spaced terminal contact pads disposed on each of two opposing side surfaces of the substrate. The connector comprises an insulated housing mountable on the board such that a forward side of the housing is located proximate to the board and a rearward side of the housing is located remote from the board. The housing has a supporting surface on its rearward side capable of supporting the substrate thereon in a generally parallel relationship to, and spaced from, the board when the housing is mounted on the board, and a plurality of spaced apart contact-receiving cavities extending through the housing from its forward side to its rearward side. The connector further comprises a plurality of electrical contacts, one of the contacts being retained within each of the cavities. Each of the contacts have a terminal portion which extends outwardly from its respective cavity proximate the forward side of the housing and is capable of electrical and mechanical connection to the external circuitry of the board when the housing is mounted on the board. Each of the contacts further have a resiliently flexible spring portion which extends from its respective cavity proximate the rearward side of the housing, the spring portions of the contacts being arranged in at least a partially overlying relationship to the supporting surface and in two opposing rows. The rows of spring portions are located respectively proximate opposing longitudinal edges of the supporting surface of the housing. The connector further comprises means disposed proximate each of the contact spring portions which retain each of the spring portions in a partially flexed, pre-loaded condition prior to the substrate being supported on the supporting surface of the housing. A contact surface is provided on each contact spring portion, the contact surface being disposed in an overlying relationship to the supporting surface of the housing and in a facing relationship toward the opposing row of contact spring portions. The contact surfaces in one of the rows of spring portions are respectively engageable with the contact pads in one of the rows of contact pads on the substrate when the substrate is supported on the supporting surface of the housing. The contact surfaces in one of the rows of spring portions are displaced from the contact surfaces in the other of the rows of spring portions, when the respective rows of spring portions are retained in their pre-loaded condition, by a distance which is slightly less than the distance between the rows of contact pads respectively disposed on the opposing side surfaces of the substrate prior to the substrate being supported on the supporting surface of the housing. When the substrate is supported on the supporting surface between the rows of contact spring portions with the contact pads of the substrate respectively electrically contacting the contact surfaces on the contact spring portions, the spring portions of the contacts are again flexed to assume a desired fully loaded condition. The housing of the connector has also a plurality of spaced apart channels formed in the forward side of the housing, each of the channels opening into one of the contact-receiving cavities at the forward side and extending therefrom along the forward side. A portion of each one of the contacts emanates from one of the cavities and extends within, and along, one of the channels. The contact portion then merges into the terminal portion of the contact which terminal portion thereby extends outwardly from the forward side of the housing at a location along the one channel offset and spaced from the one cavity. During electrical connection of the terminal portion to external electrical circuitry of the board by a solder operation, the offset, spaced location of the terminal portion from its corresponding one cavity prevents the flow of solder through the cavity to the forward side of the housing and thereby prevents damage to the spring portions of the contacts.

Other objects and attainments of the invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

BRIEF DESCRIPTION OF THE DRAWINGS

In the course of the following detailed description reference will be frequently made to the attached drawings in which.

DETAILED DESCRIPTION OF THE PREFERRED EMBODIMENT

Figure 1:
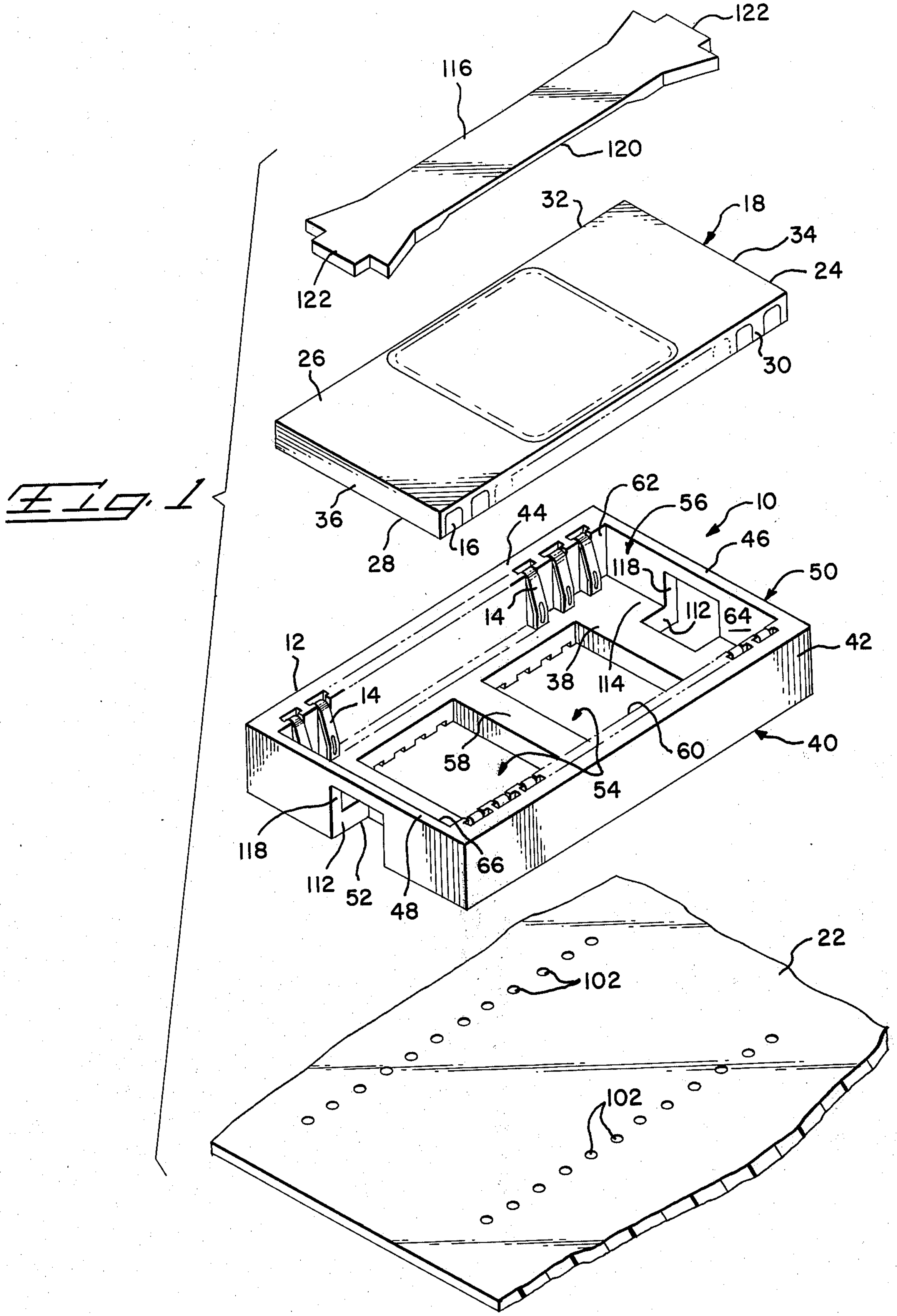
FIG. 1 is a perspective exploded view of the multi-contact electrical connector embodying the principles of the present invention.
Figures 2, 3, 4:
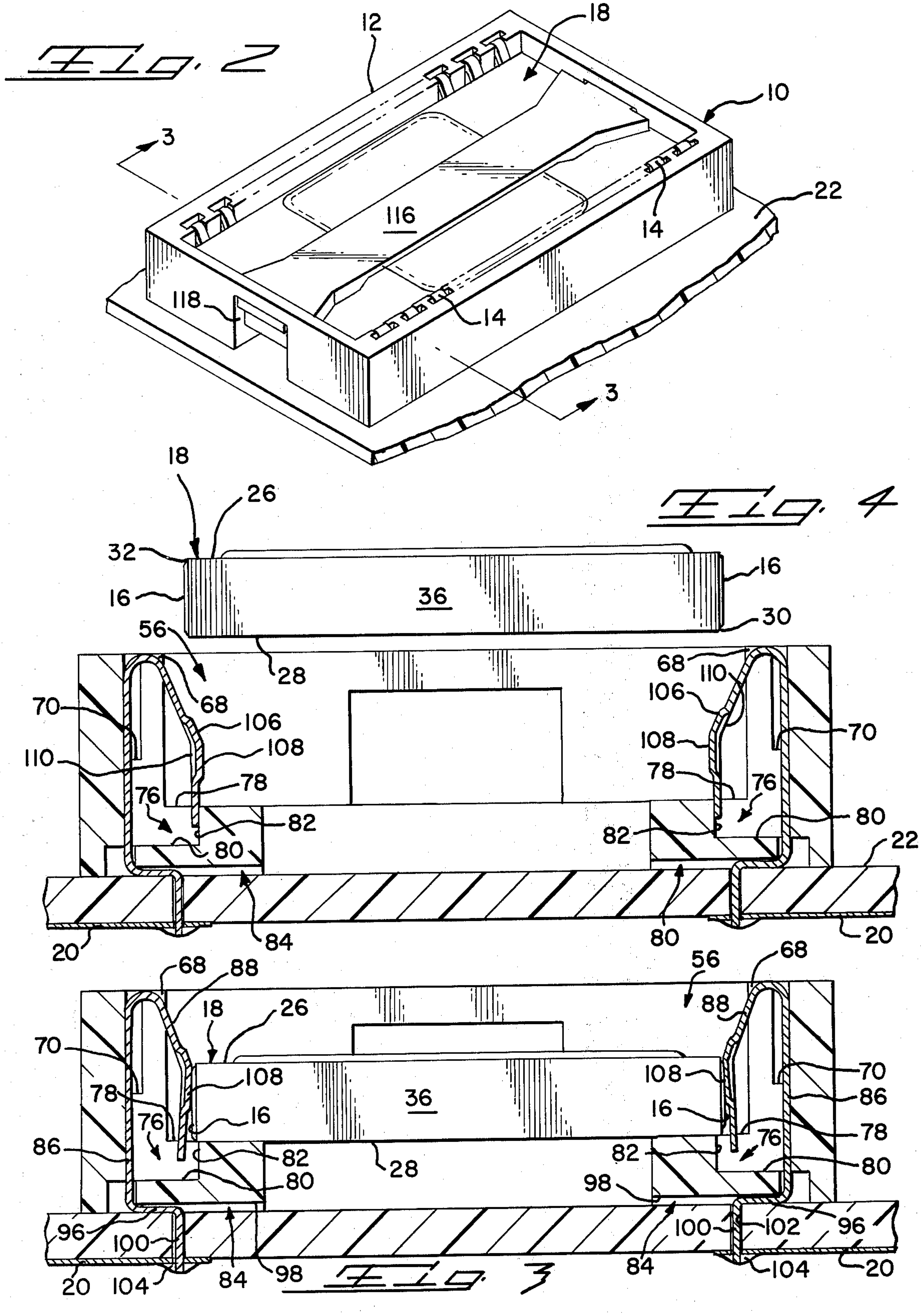
FIG. 2 is a perspective view of the connector of FIG. 1 showing the substrate supported in the connector and the connector mounted on the circuit board.
FIG. 3 is a cross-sectional view taken along line 3—3 of FIG. 2.
FIG. 4 is a cross-sectional view similar to that of FIG. 3 but showing the substrate aligned with the connector prior to insertion of the substrate into the connector.

Referring now in greater detail to the various figures of the drawings wherein like reference characters refer to like parts, there is shown at 10 in FIGS. 1 and 2 a multi-contact electrical connector forming the preferred embodiment of the present invention. The connector 10 is generally comprised by an insulating housing 12 and a plurality of electrical contacts 14 arranged in two opposing rows in the housing 12.

The connector 10 serves the function of electrically interconnecting terminal contact pads 16 of a ceramic substrate 18 supported within the housing 12 between the rows of contacts 14 with external electrical circuitry such as the conductors 20 on one side of a printed circuit board 22 as shown in FIG. 3. The substrate 18 comprises a generally rectangular ceramic body 24 having parallel faces 26, 28, side surfaces 30, 32, and end surfaces 34, 36. Conductors (not shown) contained in the ceramic body 24 extend from the terminal contact pads 16 on the side surfaces 30, 32 of the substrate 18 to an integrated circuit device (not shown) also contained at a central location within the substrate 18. Details of the structure of the substrate 18 are illustrated and described in the aforementioned, our U.S. patent application Ser. No. 226,689, now U.S. Pat. No. 3,772,637, the disclosure of which is incorporated herein by reference thereto. As previously noted, the provision of terminal contact pads 16 on the relatively narrow side surfaces 30, 32 of the substrate is a more recent practice, previous practice having been to locate these pads on one of the faces 26, 28.

As stated hereinabove, the connector 10 is generally comprised by an insulating housing 12 and a plurality of electrical contacts 14 arranged in two opposing rows in the housing 12. The housing 12 may be manufactured by conventional injection molding methods from any suitable dielectric material, such as polycarbonate or a glass filled nylon.

The housing 12 is generally rectangular having a base wall 38 at a forward side 40 of the housing 12 and a pair of opposing, elongated, parallelly-aligned side walls 42, 44 and a pair of opposing, relatively short, parallelly-aligned end walls 46, 48 extending from the base wall 38 toward a rearward side 50 of the housing 12. The housing 12 is mountable on the circuit board 22 at an exterior surface 52 of the base wall 38 of the housing 12. The base wall 38 of the housing 12 has two large openings 54 extending therethrough to facilitate dissipation of the heat generated within the housing 12 and to minimize the amount of material in the housing 12.

A central substrate-receiving cavity 56 is defined within the housing 12 by the interior surfaces 58, 60, 62, 64, 66 of the walls 38, 42, 44, 46, 48 of the housing 12. The interior surface 58 of the base wall 38 is capable of supporting the substrate 18 thereon at the face 28 of the substrate 18 in a generally parallel relationship to, and spaced from, the circuit board 22 when the substrate 18 is received within the central cavity 56 and when the housing 12 is mounted on the board 22 at the exterior surface 52 of the base wall 12 as shown in FIGS. 2 and 3.

Figure 5:
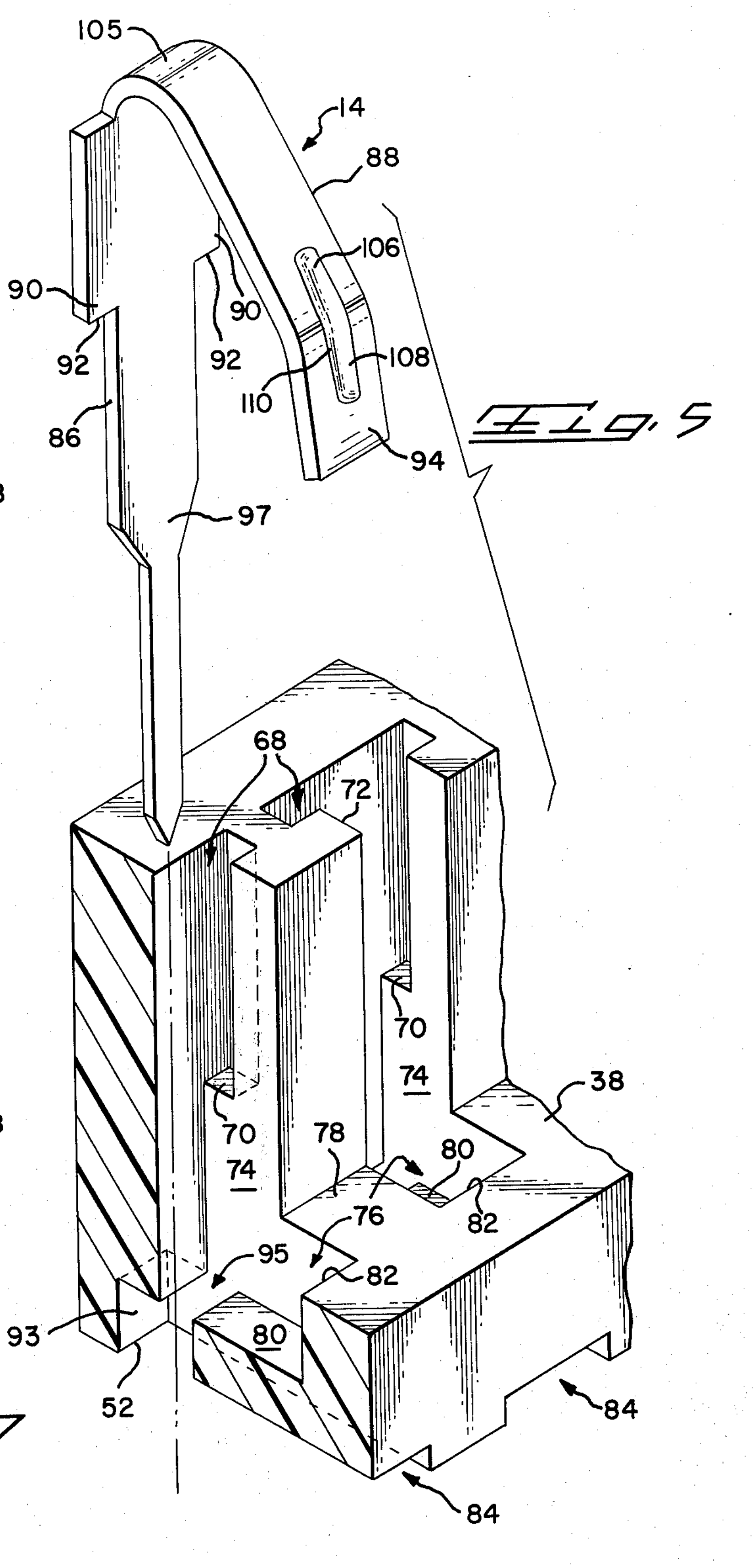
FIG. 5 is a view of an enlarged fragmentary portion of the connector showing one of the contact-receiving cavities in cross-sectional form, the view also illustrating an electrical contact aligned with the cavity and depicting the configuration of the contact prior to its insertion into the cavity.

As more clearly shown in FIGS. 3, 4, and 5, a row of spaced apart contact-receiving cavities 68 extend through each of the side walls 42, 44 of the housing 12 from the forward side 40 to the rearward side 50 of the housing 12. The contact-receiving cavities 68 open into the central cavity 56 at the interior surfaces 60, 62 of the side walls 42, 44. It is readily apparent in FIGS. 3 and 4 that the two rows of contact-receiving cavities 68 are spaced apart by a distance which is greater than the distance between the rows of contact pads 16 respectively disposed on the opposing side surfaces 30, 32 of the substrate 18. A pair of opposing recessed shelves 70, the purpose of which will be explained hereinafter, is defined within the side walls 42, 44 of the housing 12 and respectively extend laterally from two opposing sides 72, 74 of each of the contact-receiving cavities 68 at a location along each cavity 68 intermediately between the forward and rearward sides 40, 50 of the housing 12. Each of the shelves 70 face in a direction generally toward the rearward side 50 of the housing 12.

Still referring to FIGS. 3, 4, and 5, a row of spaced apart recesses 76, the purpose for which will be explained hereinafter, is formed in the interior surface 58 of the base wall 38 of the housing 12 along each of a pair of opposing longitudinal edge portions 78 of the base wall 38 which edge portions 78 are respectively located adjacent to the interior surfaces 60, 62 of the side walls 42, 44 of the housing 12. Each of the recesses 76 correspond to, and open into, one of the contact-receiving cavities 68. Each of the recesses 76 have a floor 80 at a location therein which is remote from the interior surface 58 of the base wall 38 of the housing 12. Further, each of the recesses 76 have a shoulder 82 at a location therein which is remote from the corresponding contact-receiving cavity 68 and which adjoins the floor 80 of the recess 76 and faces in a direction generally toward the corresponding cavity 68. It is readily apparent in FIGS. 3 and 4 that the shoulders 82 in one of the rows of recesses 76 are spaced apart from the shoulders 82 in the other of the rows of recesses 76 by a distance which is slightly less than the distance between the rows of contact pads 16 respectively disposed on the opposing side surfaces 30, 32 of the substrate 18.

Again referring to FIGS. 3, 4, and 5, a row of spaced apart channels 84, the purpose of which will be explained hereinafter, is formed in the exterior surface 52 of the base wall 38 of the housing 12 adjacent to the locations at which each of the rows of contact-receiving cavities 68 extend through the forward side 40 of the housing 12. Each of the channels 84 open into one of the contact-receiving cavities 68 and extend therefrom in a direction generally toward the opposite row of channels 84.

As clearly shown in FIG. 5, the center-to-center spacing between adjacent contact-receiving cavities 68, between adjacent recesses 76, an between adjacent channels 84 within each of the respective rows are substantially the same. Further, the aforementioned center-to-center spacing substantially corresponds, and is equal, to the center-to-center spacing between adjacent contact pads 16 within each of the rows of the contact pads 16 respectively disposed on the opposing side surfaces 30, 32 of the substrate 18.

FIG. 5 best illustrates the electrical contact 14 used in conjunction with the housing. The contact 14 may be fabricated by a conventional stamping and forming operation from any suitable metal, such as pre-tin plated stainless steel.

The contact 14 is basically comprised by a flat, central post portion 86 and a resiliently flexible spring portion 88 which extends outwardly from the flat post portion 86.

Figure 6:
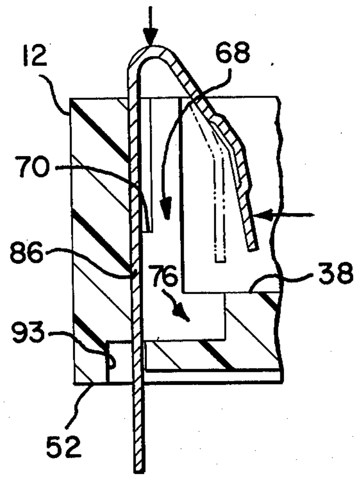
FIG. 6 is a side elevational view on a somewhat reduced scale, of the fragmentary portion of the connector shown in FIG. 5 illustrating the position of the contact within the connector prior to pre-loading of the contact spring portion.

A pair of opposing tabs 90 extend laterally from the post portion 86 along the rearward end of the post portion 86. One contact 14 is inserted into each of the contact-receiving cavities 68 from the rearward side 50 of the housing 12 until the forward edges 92 of the tabs 90 respectively seat on the recessed shelves 70 of the contact-receiving cavity 68. However, prior to when the insertion of the contact 14 brings the tabs 90 to their respective seating positions, the spring portion 88 of the contact 14 must be flexed or deflected toward the cavity 68, as shown in FIG. 6, in order that a free end 94 of the spring portion 88 may be inserted into the recess 76 of the base wall 38 simultaneously as the tabs 90 of the flat post portion 86 are brought to their seated position on the recessed shelves 70.

After the contact 14 has been inserted into its respective contact-receiving cavity 68, a forward portion of the flat post portion 86 extends from the cavity 68 at the forward side 40 of the housing 12. Each of the contact-receiving cavities 68 includes a forward cavity portion 93 which is offset from the remainder of the cavity 68 at the rearward side 50 of the housing 12 and communicates with one of the channels 84 and the exterior of the housing 12. The forward cavity portion 93 further communicates with the remainder of cavity 68 through an opening 95 having cross-sectional dimensions which provides sufficient clearance for passage of the post portion 86 of the contact 14 but which are substantially less than the cross-sectional dimensions of the cavity 68 proximate to the rearward side 50 of the housing 12. The cross-sectional dimensions of the forward cavity portion 93 are substantially greater than the cross-sectional dimensions of the opening 95 since, in the preferred embodiment, the cavity portion 93 is intended to provide, in addition to the clearance for the contact 14, adequate space for back-up tool to be applied against the exposed portion of the contact 14 within the cavity portion 93 during the bending operations to be described hereinafter.

Figure 7:
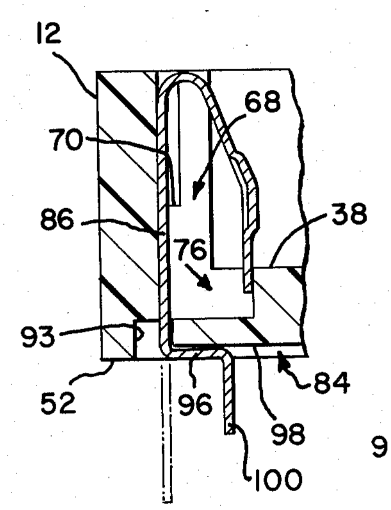
FIG. 7 is a side elevational view similar to that of FIG. 6 but now showing the contact spring portion in its pre-loaded condition and showing the final configuration of the terminal portion of the contact.

The forward portion of the post portion 86 is bent by conventional forming tools (not shown) in the manner shown in FIG. 7 to now provide a bent portion 96 which merges from the post portion 86 at the cavity portion 93 proximate the forward side of the housing 12 and extends in a transverse relationship to the longitudinal axis of the post portion 86, within, and along, one of the channels 84 formed in the exterior surface 52 of the base wall 38 which opens into the cavity portion 93 of the contact-receiving cavity 68. It will be noted in FIG. 5 that the post portion 86 drastically widens at 97, in going from the forward portion to the rearward portion of the post portion 86. This drastic widening encourages bending at this area 97. Now, therefore, the bent portion 96 by being disposed proximate to, and engageable with, a ceiling 98 within the channel 84 which faces in a direction generally toward the forward side 40 of the housing 12 and the pair of tabs 90 by engaging the recessed shelves 70 which face in a direction generally toward the rearward side 50 of the housing 12 together cooperate to insure retention of the contact 14 within the contact-receiving cavity 68.

The forward portion of the post portion 86 is further bent to now provide a terminal portion 100 which merges from the bent portions 96 anad extends outwardly from the forward side 40 of the housing 12 at a location along the channel 84 which is offset and spaced from the opening 95 of the contact-receiving cavity 86. The terminal portion 100 is capable of electrical and mechanical connection to the conductor 20 of the circuit board 22 when the housing 12 is mounted on the board 22 preferably by insertion of the terminal portion 100 through an aperture 102 formed through the circuit board 22. When electrical connection of the terminal portion 100 of the contact 14 to the conductor 20 of the board 22 is achieved by a soldering operation, the now established offset spaced location of the terminal portion 100 from the opening 95 of the corresponding contact-receiving cavity 86 prevents the flow of solder 104 through the cavity 86 to the rearward side 50 of the housing 12, which, if not prevented, would allow the solder 104 to render the desired flexing action of the spring portion 88 of the contact 14 ineffective.

With the contact in its fully inserted position and desired configuration as shown in FIGS. 3, 4, and 7, the flexible spring portion 88 extends from its respective cavity 86 proximate the rearward side 50 of the housing 12 in an overlying relationship to the plane of the interior surface 58 of the base wall 38 and in a direction generally toward the corresponding one of the recesses 76 formed in the interior surface 58 of the base wall 38. As stated hereinbefore, during insertion of the contact 14 the spring portion 88 was partially flexed or deflected in a direction generally toward its respective cavity 68 so that ther terminating free end 94 of the spring portion 88 would extend into the corresponding one recess 76 uoon continued insertion of the contact 14. Upon extension into the one recess 76, the free end 94 of the spring portion 88 is designed to abut the shoulder 82 of the one recess 76 at a location along the shoulder 82 which is spaced from the floor 80 of the one recess 76 to thereby provide the spring portion 88 of the contact 14 in a pre-loaded condition and also to avoid any tendency for the free end 94 to drag on the floor 80 of the recess 76 upon further deflection of the spring portion 88 toward its respective cavity 68. It will be noted in FIG. 5, also, that the post portion 86 is drastically wider than the spring portion 88 at their location of merger. Therefore, the pivotal axis of the spring portion tends to be centered approximately at area 105 adjacent to the merger location.

The spring portion 88 of each contact 14 has a camming surface 106 thereon located remote from the free end 94 of the spring portion 88. The leading opposing longitudinal edges 16 of the substrate 18 engage the camming surfaces 106 during insertion of the substrate 18 into the housing 12 and cause further flexing or deflection of each of the spring portions 88 toward its respective one of the contact-receiving cavities 68 until each of the spring portions 88 has deflected to its respective desired fully loaded condition at which time the substrate 18 is positioned upon the interior surface 58 of the base wall 38 between the rows of contacts 14.

The spring portion 88 of each contact 14 has a contact surface 108 thereon located adjacent to the free end 94 of the spring portion 88. When the contact 14 is in its fully inserted position as shown in FIG. 4, the contact surface 108 of the spring position 88 is disposed adjacent to, and in an overlying relationship to the plane of, the interior surface 58 of the base wall 38 and in a facing relationship toward the opposing row of contacts 14. In the preferred embodiment, the contact surface 108 is disposed generally perpendicular to the plane of the interior surface 58. The contact surfaces 108 on the contacts 14 in one of the rows of contacts 14 are spaced apart from the contact surfaces 108 on the contacts 14 in the other of the rows of contacts 14 by a distance which is slightly less than the distance between the rows of contact pads 16 respectively disposed on the opposing side surfaces 30, 32 of the substrate 18. The contact surface 108 preferably is on an embossment on the spring portion 88 as shown at 110 in order to define a precise contact area on the spring portion 88.

Therefore, as is readily illustrated in FIGS. 3 and 4, when the substrate 18 is placed in the substrate-receiving cavity 56 of the housing 12 and supported on the interior surface 58 of the base wall 38 of the housing 12 between the opposing rows of contacts 14 with the contact pads 16 of the substrate 18 respectively electrically engaging the contact surfaces 108 on the contacts 14 in the two opposing rows of contacts 14, the spring portion 88 of each of the contacts 14 will be additionally flexed or deflected toward its corresponding cavity 68 so as to displace the free end 94 of the spring portion 88 of each contact 14 away from the shoulder 82 of the corresponding recess 76. With the free end 94 of the spring portion 88 so displaced from the shoulder 82 of the recess 76 and from the floor 80 of the recess 76, as shown in FIG. 3, a desired predetermined contacting pressure is achieved between the contact surface 108 and the contact pad 16 by substantially normal or perpendicular forces imposed on the pads by the spring portions 88 to provide a good electrical connection therebetween the contact surfaces 108 and the pads 16 having a desired low contact resistance characteristic.

Referring again to FIG. 1, there is illustrated a slot 112 formed through each of the end walls 46, 48 of the housing 12 at the forward side 40 of the housing 12 and also through each of a pair of opposite edge portions 114 of the base wall 38 respectively adjacent to the end walls 46, 48. These slots 112 provide access by a convention prying tool (not shown) to the face 28 of the substrate 18 on which face 28 the substrate 18 is mounted on the interior surface 58 of the base wall 38 in order to facilitate one manner of removal of substrate 18 from the housing 12.

Also shown in FIG. 1, a strap 116 is provided for assembly to the housing 12 in an overlying relationship to the substrate 18 when the substrate 18 is supported on the interior surface 58 of the base wall 12. An interengaging means in the form of a slot 118 is disposed on each of the end walls 46, 48 of the housing 12 for securing the strap 116 to the housing 12 as best shown in FIG. 2. Although the contact spring portion 88 provides adequate retention of the substrate 18 therebetween under most conditions, the strap 116 is an optional feature of the connector 10 which may be beneficial if the circuit board 22 on which the connector 10 and substrate 18 are mounted is disposed in a vertical position or an inverted position instead of the horizontal position as shown in FIG. 2. Also, the strap 116 may be of benefit when the connector 10 is used in an environment wherein severe vibrations may be encountered.

The strap 116 has a central recess 120 on its forward facing surface into which a prying tool or the like (not shown) may be inserted in order to flex the strap 116 and thereby disengage opposing end tabs 122 of the strap 116 from slots 118 of the end walls 46, 48 of the housing 12 and thereby achieve disassembly of the strap 116 from the housing 12.

It is apparent from the drawings that the overall dimensions of the connector 10 are only slightly greater than the overall dimensions of the substrate 18 so that the substrates can be mounted very close to each other on a printed circuit board and so that a number of boards having connectors thereon may be stacked closely together. A further advantage of the connector 10 is that the connector can be serviced from its rearward side; that is it can be assembled to the board and the individual ceramic substrates in an array of connectors can be removed from, or assembled to, the connectors from their rearward sides. Also the contacts of the connector may be electrically tested from its rearward side both before and after the substrate is inserted in the connector. An additional advantage of the connector is that the contacts in the housing are protected during shipment and handling.

It is thought that the invention and many of its attendant advantages will be understood from the foregoing description and it will be apparent that various changes may be made in the form, construction and arrangement of the connector described without departing from the spirit and scope of the invention or sacrificing all of its material advantages, the form hereinbefore described being merely a preferred embodiment thereof.

What is claimed is:

1. In combination with a panel-like member such as a substrate having circuit means on one face thereof and having conductors extending from the circuit means to and across the edges of the panel-like member, an electrical connector comprising:

a. an insulating housing having a central substrate-receiving area on one side thereof with the panel-like member being located therein with its conductor-carrying edges being positioned perpendicular to the plane of the receiving area;

b. a plurality of contact-receiving cavities extending vertically through said housing from one side to the other and disposed normal and in at least partially surrounding relationship to the central substrate-receiving area, said cavities being defined in part by a recess providing a shoulder facing toward the contact-receiving cavities and extending below the level thereof;

c. a plurality of electrical contact terminals each having a post portion and a spring portion and positioned in a cavity with the spring portion being nearest the central substrate-receiving area with the free end of the spring portion extending into the recess whereby the shoulder flexes the spring portion into a pre-loaded condition, and with a part of the post portion depending from the housing; and d. contact means on and integral with the spring portion of each of the contact terminals, said contact means being parallel to and in biasing engagement with the conductors on the edges of the panel-like member positioned in the central receiving area.

2. The electrical connector of claim 1 further including:

a. openings positioned in each end wall of the housing; and b. an elongated strap positioned across the panel-like member with the ends of the strap removably positioned in the openings.

* * * * *